(12) United States Patent
Tsai et al.

(10) Patent No.: US 8,675,515 B2
(45) Date of Patent: Mar. 18, 2014

(54) ELASTIC MULTIPLEXING FOR SHARED CONTROL CHANNELS

(75) Inventors: Ming-Chang Tsai, San Diego, CA (US); Pillappakkam Bahukutumbi Srinivas, San Diego, CA (US); Chiachi Sung, San Diego, CA (US); Sivaram S. Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 12/948,078

(22) Filed: Nov. 17, 2010

(65) Prior Publication Data

US 2012/0014297 A1 Jan. 19, 2012

Related U.S. Application Data

(60) Provisional application No. 61/263,878, filed on Nov. 24, 2009.

(51) Int. Cl.
*H04L 12/26* (2006.01)
(52) U.S. Cl.
USPC ........................................ 370/252; 370/310.2
(58) Field of Classification Search
USPC ................. 370/310–350; 455/3.01–446
See application file for complete search history.

(56) References Cited

U.S. PATENT DOCUMENTS

| | | | |
|---|---|---|---|
| 2006/0153152 A1* | 7/2006 | Kondylis et al. | 370/338 |
| 2006/0256805 A1 | 11/2006 | Cho et al. | |
| 2007/0036170 A1 | 2/2007 | Gonikberg et al. | |
| 2008/0219370 A1* | 9/2008 | Onggosanusi et al. | 375/260 |
| 2009/0196247 A1 | 8/2009 | Fan et al. | |
| 2011/0205924 A1* | 8/2011 | Gonikberg et al. | 370/252 |

FOREIGN PATENT DOCUMENTS

WO  WO2010015429 A1  2/2010

OTHER PUBLICATIONS

International Search Report and Written Opinion—PCT/US2010/057912, International Search Authority—European Patent Office—Feb. 15, 2011.
Taiwan Search Report—TW099140630—TIPO—Apr. 23, 2013.

* cited by examiner

*Primary Examiner* — Wanda Z Russell
(74) *Attorney, Agent, or Firm* — Darren M. Simon

(57) ABSTRACT

A method and apparatus are disclosed for performing elastic multiplexing for shared control channels in a wireless device in a wireless communication system. The present work includes, but is not limited to, phase feedback for closed-loop transmit diversity (CL-TD) in mobile wireless communication systems. The method enhances system performance with control channel scheduling flexibility around resource conflicts such as blocking and preemption. The present work discloses an elastic multiplexing processor that is cable of carrying out the elastic multiplexing process.

20 Claims, 9 Drawing Sheets
(5 of 9 Drawing Sheet(s) Filed in Color)

ELASTIC MULTIPLEXING FOR SHARED CONTROL CHANNELS

REFERENCE TO RELATED APPLICATION

This patent application claims priority to U.S. Provisional Patent Application Ser. No. 61/263,878 that was filed on Nov. 24, 2009 and assigned to the assignee hereof, and is hereby expressly incorporated by reference herein.

BACKGROUND

1. Field

The present work relates generally to digital communication systems, and more specifically to the multiplexing design for shared control channels in wireless devices.

2. Background

The operation of mobile wireless communication systems requires significant control overhead in both uplink (UL) and downlink (DL) directions. Control signaling effectiveness over a wide range of operating scenarios is oftentimes limited by the availability of over-the-air (OTA) resources and scheduling inflexibility, especially when blocked or preempted by higher priority control signaling or conflicting operations. One possible solution for handling control channel scheduling conflicts involves suppressing the control signaling in conflict. This approach results in associated control loops being temporarily out-of-sync which is undesirable given that control signaling rates are often already critically low for OTA overhead reduction. A second possible solution involves freezing control signaling during conflict. This approach results in delayed signaling for all control loops with potentially even more significant impact to system performance than that of suppressing the control signaling. A third possible solution involves deferring control signaling in conflict. This approach results in as much system performance impact as freezing when the control channel is in full utilization.

Control channels in both downlink (DL) and uplink (UL) consume a non-negligible percentage of available OTA resources that could otherwise be used for data traffic. Scarce OTA resources allocated for use as control channels are typically shared among as many mobile users or functionalities as possible for efficiency at various levels. Parts of the system design comprise different forms and combinations of well-known and widely adopted multiplexing schemes including frequency division multiplexing (FDM), time division multiplexing (TDM), code division multiplexing (CDM), etc.

Design of control channels multiplexing varies depending on characteristics and requirements of signaling. One extreme class of multiplexing design tries to dedicate a part of channel resources for specific control signaling that is essential to system operation (at the cost of potential under-utilization). Examples include dedicated control channels in cdma2000, UMTS/WCDMA, etc.

A compromised class of multiplexing design attempts to improve utilization by guaranteeing channel resources availability among a pre-determined group of users for specific need of control signaling. Examples include shared control channels in cdma2000, UMTS/WCDMA, UMB, etc.

Another extreme class of multiplexing design allows control signaling to block or to preempt existing assignments of channel resources in an on-demand fashion. As it turns out, this class of multiplexing design has become more widely used in many mobile wireless communication systems rather than just in special cases. Many examples of this type of multiplexing design can be found including (1) data traffic suppressed by control signaling, such as dim-and-burst (D&B) and blank-and-burst (B&B) for circuit voice of AMPS and CDMA, and (2) data traffic frozen by control signaling, such as FL control signaling in 802.20 design, and (3) data traffic deferred by control signaling, such as FL control signaling in UMB design, and (4) control signaling suppressed by higher priority signaling, such as the relatively complicated hop permutations in UMB design such as, for example, (i) F-DPICH, F-CQIPICH & F-BPICH puncturing F-DCH, (ii) F-CQIPICH & F-BPICH puncturing FLCS, (iii) R-ACKCH & R-ODCCH puncturing R-ODCH, and (iv) R-ACKCH puncturing R-CDCCH, and (5) control signaling suppressed due to operation design, such as single power amplifier (PA) flavor of dual-antenna Closed Loop-Transmit Diversity (CL-TD) design for the radio link (RL) of UMTS/HSPA, which requires the mobile unit to transmit from only one of two antennas periodically for channel estimate update at the base station. There is no need for phase feedback signaling when the mobile unit is transmitting from only one antenna.

The single primary antenna (PA) flavor of dual-antenna radio link (RL) closed-loop transmit diversity (CL-TD) design for UMTS/HSPA is a simple but effective example for clearly illustrating multiplexing issues of shared control signaling. A simplified diagram of RL CL-TD architecture 100 is shown in FIG. 1. RL CL-TD architecture 100 comprises base station 110, channel 135 and mobile station 140. Base station 110 comprises a receiver (Rx) 115, phase measurement unit 120, phase quantization unit 125 and transmitter (Tx) 130. Mobile station 140 comprises a receiver (Rx) 145, phase de-quantization unit 150, phase control unit 155 and transmitter (Tx) 160. Base station 110 processes a wireless signal received through the channel 135 from the mobile station 140 to estimate phase adjustment for better reception, and quantizes such estimates for signaling back to the mobile station 140, which makes adjustments accordingly.

The RL CL-TD operation requires more than one transmit antenna, but not necessarily more than one primary antenna (PA), when operating over a slowly varying or quasi-stationary channel. FIG. 2 shows one possible way of achieving RL CL-TD with single-PA, by transmission from both primary antenna 210 and secondary antenna 220 for M slots (M=8 in the FIG. 2 example), driven by the same (and the only) primary antenna (PA) 210, followed by transmission only from the primary antenna 210 for N slots (N=3 in the FIG. 2 example), followed by transmission from both antennas (210, 220) again, etc. Periodically turning off the secondary transmit antenna 220 allows the base station 110 to separate responses from two transmit antennas (210, 220) for estimation of phase adjustment.

Assume now a separate code channel of spreading factor (SF) 256 is used for phase feedback signaling among up to ten (10) mobile units in each of 1500 Hz slots, similar to F-DPCH arrangement for RL power control signaling when operating in high speed (HS) mode. The phase feedback signaling rate required depends on a capacity-performance tradeoff of the RL channel scenarios that the CL-TD is intended to handle. In FIG. 3, the letter K represents the number of mobile users that share the phase feedback control channel. FIG. 3 shows examples of phase feedback signaling at 1500 Hz (K=1), 750 Hz (K=2), 500 Hz (K=3), 375 Hz (K=4), 300 Hz (K=5) and 150 Hz (K=10), with suppression during single-antenna transmission periods. For each of the illustrated examples, with the various values of K, FIG. 3 shows the case for only one user currently active.

The lower the phase feedback signaling rate, the greater number of mobile users a single control channel can obviously accommodate. However, the lower the phase feedback signaling rate, the more impact from a single-antenna transmission during which the phase feedback signaling is not available. As can be observed in FIG. 3, with M=8 and N=3, but with only one active user, the interval between two phase feedback signaling time slots is extended by a full period (i.e., a full time slot) each time the phase feedback signaling is blocked. The effect of blocking phase feedback signaling becomes more severe on any given user as the number of users K increases. The effect of blocking phase feedback signaling is most severe when blocked consecutively as in the case of 150 Hz when the value of K is ten (K=10).

The implication is that system performance is significantly degraded when phase feedback signaling is blocked, unless wireless control channel resources are sufficiently over-allocated for phase feedback signaling. Neither situation is desirable, because both imply a sub-optimal tradeoff of system performance.

As mentioned above, one conventional alternative is to temporarily freeze the scheduling of control signaling as if the durations of single-antenna transmission are simply inserted into the timeline as shown in FIG. 4, which depicts the situation of only one active user (to facilitate comparison with FIG. 3). This technique works best if phase feedback signaling is blocked only very briefly, but obviously still leaves room for improvement in the sense that it delays all signaling by the same amount regardless of signaling rate and control channel utilization or system loading.

Another conventional alternative mentioned above involves deferring the scheduling of only the control signaling that is blocked during single-antenna transmission as shown in FIG. 5. FIG. 5 also depicts the situation of only one active user (to facilitate comparison with FIGS. 3 and 4). This technique is able to take advantage of control channel utilization and to delay individual phase feedback signaling by a minimally necessary amount, while still degenerating into the result of FIG. 4 when the system approaches full loading.

Further complications to multiplexing of shared control signaling for single-PA RL CL-TD, which are applicable to shared control signaling in general as well, include the fact that it is potentially desirable to adapt the timing and duration for transmission from the single antenna, adapt the rate of phase feedback signaling, as well as adapting other operation parameters for all mobile versus for individual mobiles, etc.

There is therefore a need in the art for improvements in the multiplexing design for shared control channels in wireless devices.

SUMMARY

The present work discloses an elastic multiplexing design for shared control channels in wireless devices. The present work includes, but is not limited to, phase feedback for closed-loop transmit diversity (CL-TD) in mobile wireless communication systems. The method of the present work enhances system performance with control channel scheduling flexibility around resource conflicts such as blocking and preemption with resorting to complicated scheduling rules that are employed in prior art methods. The present work discloses a microprocessor and an elastic multiplexing algorithm software that together comprise an elastic multiplexing processor that is cable of carrying out elastic multiplexing for shared control channels in a wireless device.

BRIEF DESCRIPTION OF THE DRAWINGS

This patent or patent application file contains at least one drawing executed in color. Copies of this patent or patent application publication with color drawing(s) will be provided by the Patent Office upon request and payment of the necessary fee.

DETAILED DESCRIPTION

Figure 1:
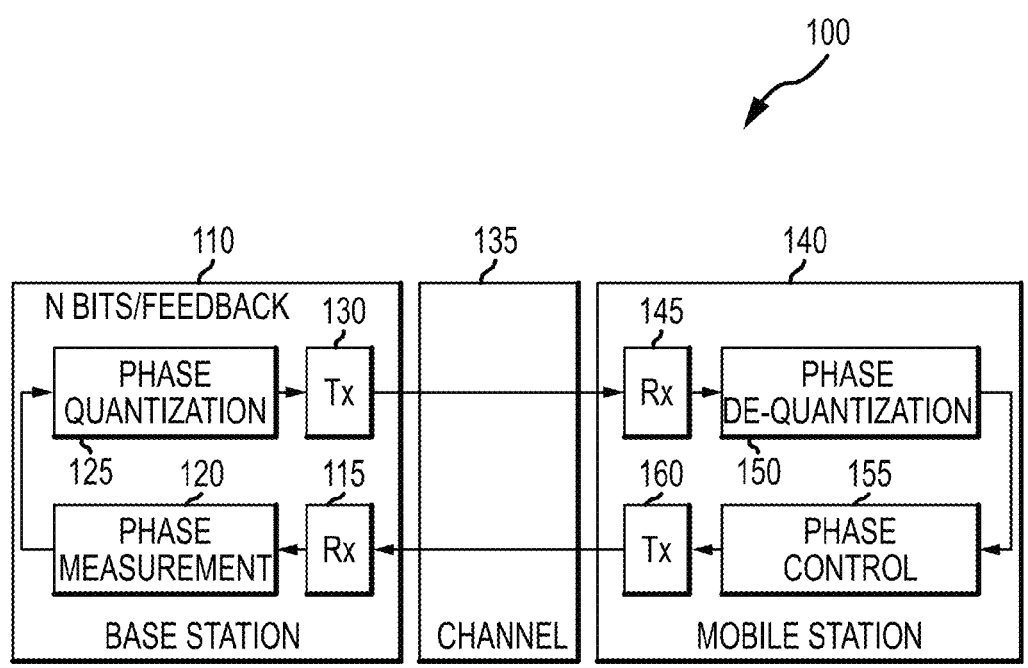
FIG. 1 illustrates an exemplary architecture of a radio link (RL) closed-loop transmit diversity (CL-TD) device in accordance with the prior art.
Figure 2:
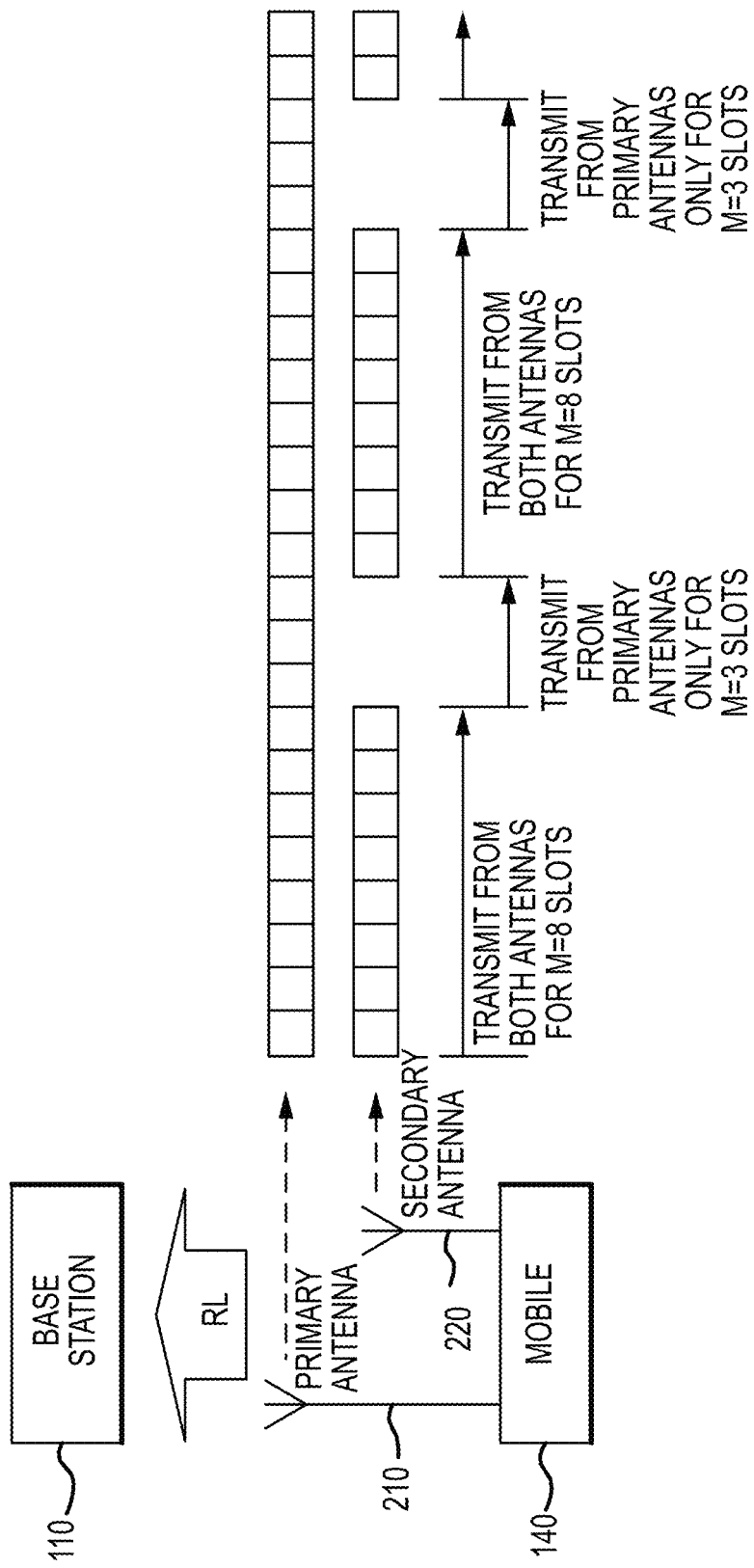
FIG. 2 illustrates a transmit operation of a single power amplifier (PA) radio link (RL) closed-loop transmit diversity (CL-TD) device in accordance with the prior art.

The detailed description set forth below is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

The present work minimizes deviation of control signaling due to any type of scheduling conflict that may be deemed necessary and critical for proper operation and desirable performance of mobile wireless communication systems. The present work therefore minimizes the need for potential over-allocation of control channel resources in defense at varying levels of control channel utilization.

The present work provides an elastic multiplexing approach for shared control signaling such as, but not limited to, phase feedback signaling for closed-loop transmit diversity (CL-TD) in mobile wireless communication systems. Elastic multiplexing aims to enhance system performance with control channel scheduling flexibility around resource conflicts such as blocking and preemption in the narrow sense, as well as general sharing in the broad sense, without resorting to typical methods including complicated sets of scheduling rules, pre-determined sets of resource allocation patterns, or extensive computations for permutation.

In some embodiments, elastic multiplexing generalizes control channel multiplexing by identifying predetermined allocations of control channel resources (which resource allocations are typically the norm for conventional multiplexing approaches) as special cases, while promoting, as a more powerful and flexible concept for all scenarios, occasional on-demand scheduling or re-scheduling (conventionally used for exceptions handling) due to blocking or preemption. In a broad sense, control channel multiplexing is about handling potentially conflicting needs of control signaling within the same physical or logical medium whether happening regularly or not.

Some key ideas of elastic multiplexing for shared control channels include (1) requirements of control signaling are not necessarily the same among all users and all purposes, and (2) requirements for specific control signaling of specific users could vary over time, and (3) pre-determined allocation of control channel resources more for ease of management at the cost of flexibility and performance, and (4) control signaling multiplexing can be more effective by having mixed signaling needs all dynamically competing for resources allocation one at a time, and (5) effective multiplexing of mixed control signaling requiring forward adjustment as well as backward adjustment to signaling timing, and (6) forward adjustment to signaling timing reduces variation of multi-signaling interval, and (7) backward adjustment to signaling timing reduces variation of individual signaling interval, and (8) best multiplexing results may require combination and iteration of forward as well as backward adjustment.

Control signaling in mobile wireless communication systems typically occurs at rates deemed critical or sufficient to keep the system in proper operation with desired performance. Blocking or preemption of specific control signaling for whatever reason causes a temporary deviation (in an associated aspect of system operation) from a designed level of synchronization, and likely in performance as well. To keep the rate of signaling above what is critically needed, and with sufficient margin as defense against potential disruptions in scheduling, could itself be more costly to system performance than the problem it is trying to solve. It is therefore desirable for the control signal multiplexing to be inherently more robust around disruptions in channel resources availability such that the individual signaling rate can be kept only minimally above what is critically needed for best capacity-performance.

Figure 6:
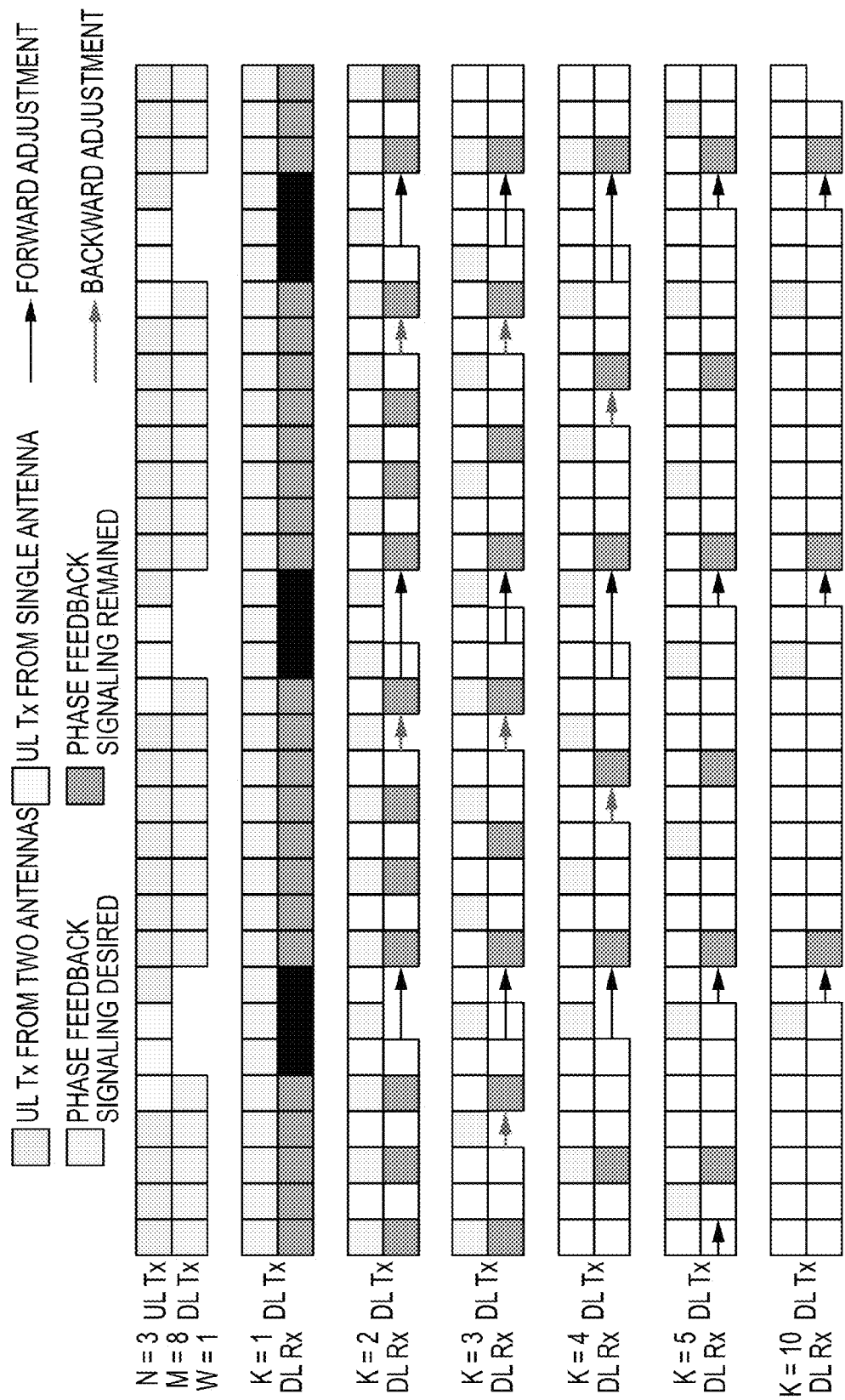
FIG. 6 illustrates a transmit operation of a single primary antenna (PA) radio link (RL) closed-loop transmit diversity (CL-TD) device in accordance with the present work when phase feedback is performed with single user elastic multiplexing for shared control channels.

In some embodiments, elastic multiplexing employs forward and backward adjustments applied iteratively to minimize the worst case signaling interval, as shown in FIG. 6 for a single active user.

Figure 5:
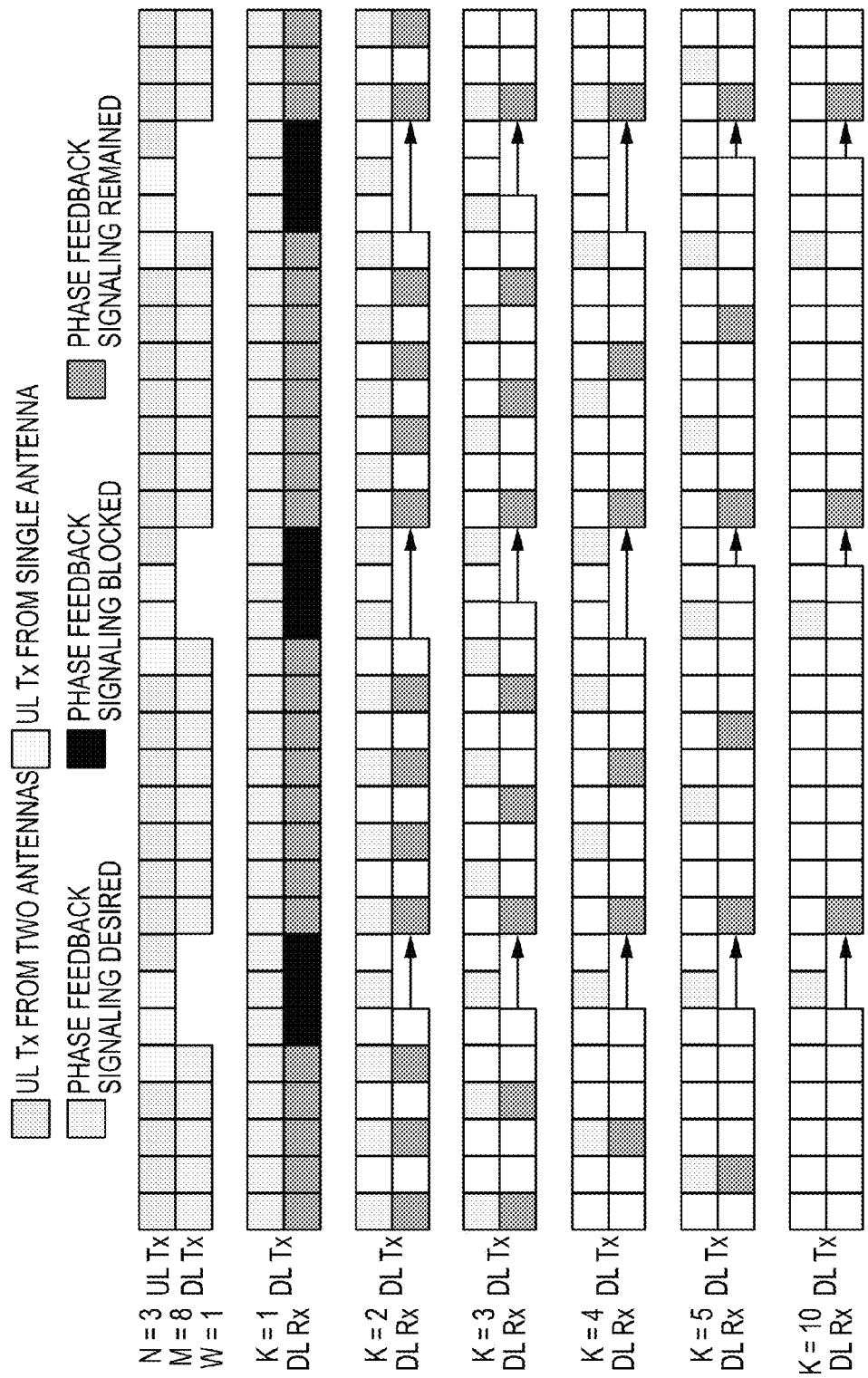
FIG. 5 illustrates a transmit operation of a single primary antenna (PA) radio link (RL) closed-loop transmit diversity (CL-TD) device in accordance with the prior art when phase feedback is deferred when blocked.

The forward adjustments in FIG. 6 are identical to those that are shown in FIG. 5. Elastic multiplexing also introduces backward adjustments. For the K=2 case, the seventh ($7^{th}$) and eleventh ($11^{th}$) signaling periods are intentionally delayed by one slot to reduce the worst-case signaling interval from five (5) to four (4). For the K=3 case, the second ($2^{nd}$), fifth ($5^{th}$), and eighth ($8^{th}$) signaling periods are intentionally delayed by one (1) slot to reduce the worst-case signaling interval from five (5) to four (4). For the K=4 case, the third ($3^{rd}$) and fifth ($5^{th}$) signaling periods are intentionally delayed by one (1) slot to reduce the worst-case signaling interval from seven (7) to six (6).

Figure 7:
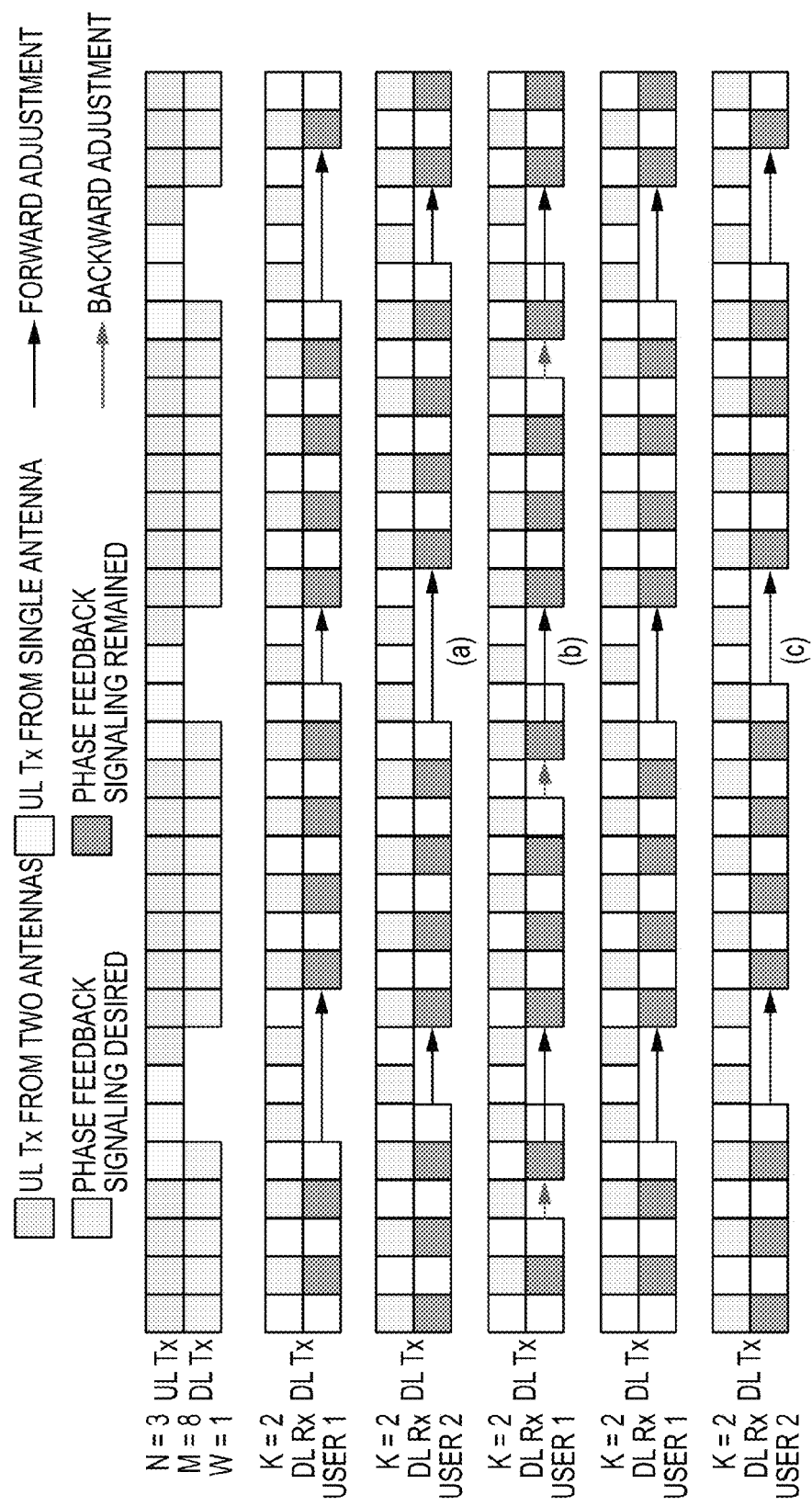
FIG. 7 illustrates a transmit operation of a single primary antenna (PA) radio link (RL) closed-loop transmit diversity (CL-TD) device in accordance with the present work when phase feedback is performed with multi-user elastic multiplexing for shared control channels.

The application of elastic multiplexing to two users (K=2) is shown in FIG. 7 according to some embodiments of the present work. FIG. 7(a) shows two users assigned every other slot for signaling, and deferred when blocked. The signaling intervals for both users was designed to be two (2) time slots, but ended up being two (2), four (4) and six (6) time slots due to blocking FIG. 7(b) shows that when only one of the two users is active, elastic multiplexing allows signaling intervals for the active user to be two (2), three (3) and four (4) time slots. FIG. 7(c) further shows that when the second user (User 2) becomes active, elastic multiplexing still allows smaller signaling intervals for both users, with the worst case being five (5) time slots instead of six (6) time slots, compared to that of FIG. 7(a). The case with K=2 that is shown in FIG. 7 is a relatively difficult example given little flexibility in scheduling. Elastic multiplexing can be used to schedule not only multiple users, but also multiple logical channels.

The situation that is shown in FIG. 7(b) provides an example of elastic multiplexing that implements both forward-looking and backward-looking adjustments. The phase feedback signaling of FIG. 7(b) accommodates two users (K=2), but the specific example shown assumes only a single active user. For each of the three intervals (each interval being three (3) time slots wide) where phase feedback signaling is blocked, the elastic multiplexing first looks forward in time to determine how the phase feedback signaling will be resumed after the blocked interval. For each blocked interval, the forward-looking consideration decides that the blocked phase feedback signaling is to be deferred until the end of the blocked interval. Accordingly, the phase feedback signaling is resumed in the first time slot after the blocked interval. (This is designated "forward adjustment" in FIG. 7(b).)

After the forward-looking adjustment, the elastic multiplexing looks backward in time. This backward-looking consideration determines that, if the last phase feedback signaling transmission before the blocked interval is suitably delayed (by one time slot in the example of FIG. 7(b)), this will locate the constituent feedback transmissions more uniformly within the overall sequence of transmissions. Accordingly, the last phase feedback signaling transmission before the blocked interval is delayed by one time slot in FIG. 7(b). (This is designated "backward adjustment" in FIG. 7(b).)

Figure 3:
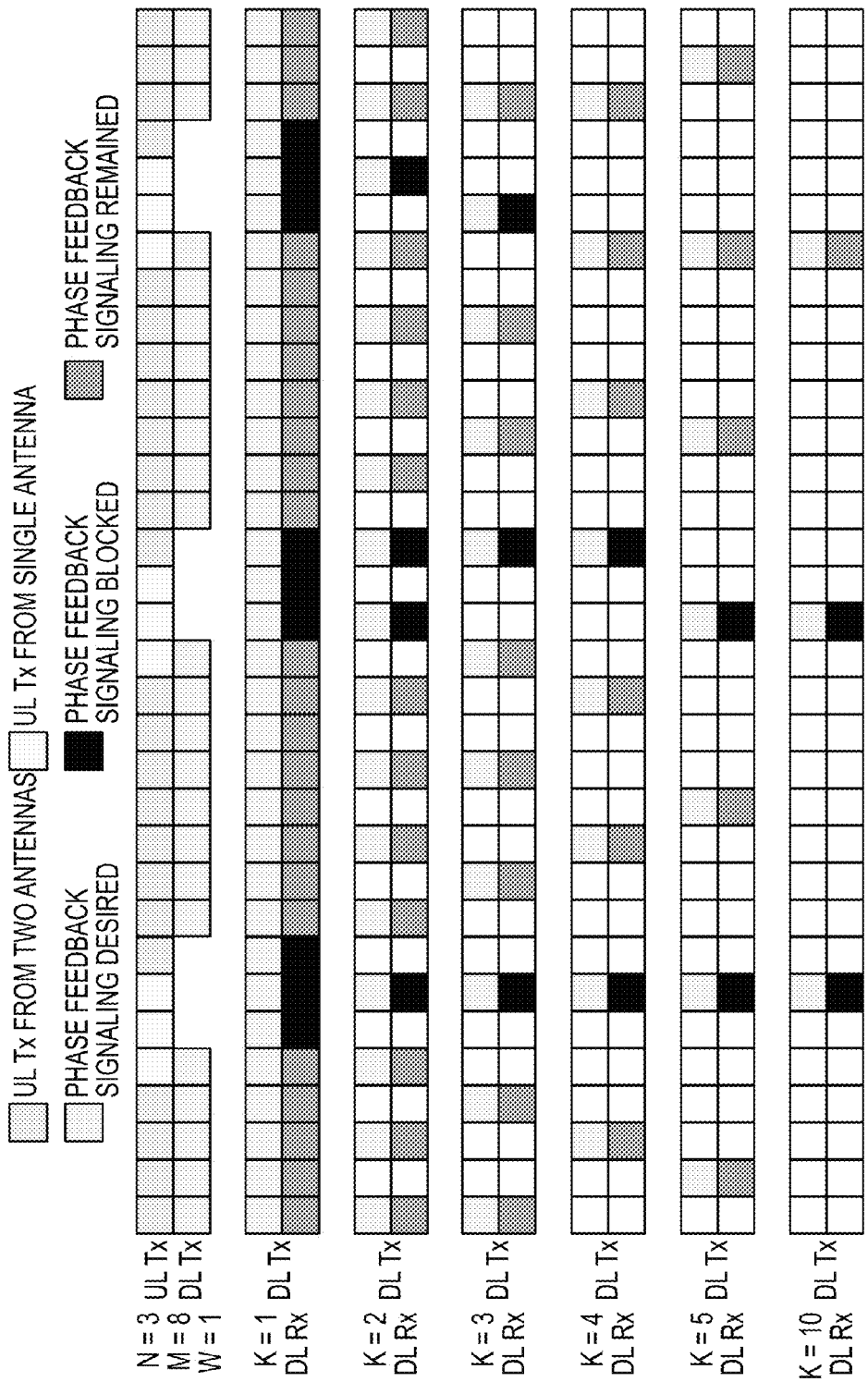
FIG. 3 illustrates a transmit operation of a single primary antenna (PA) radio link (RL) closed-loop transmit diversity (CL-TD) device in accordance with the prior art when phase feedback is suppressed when blocked.
Figure 4:
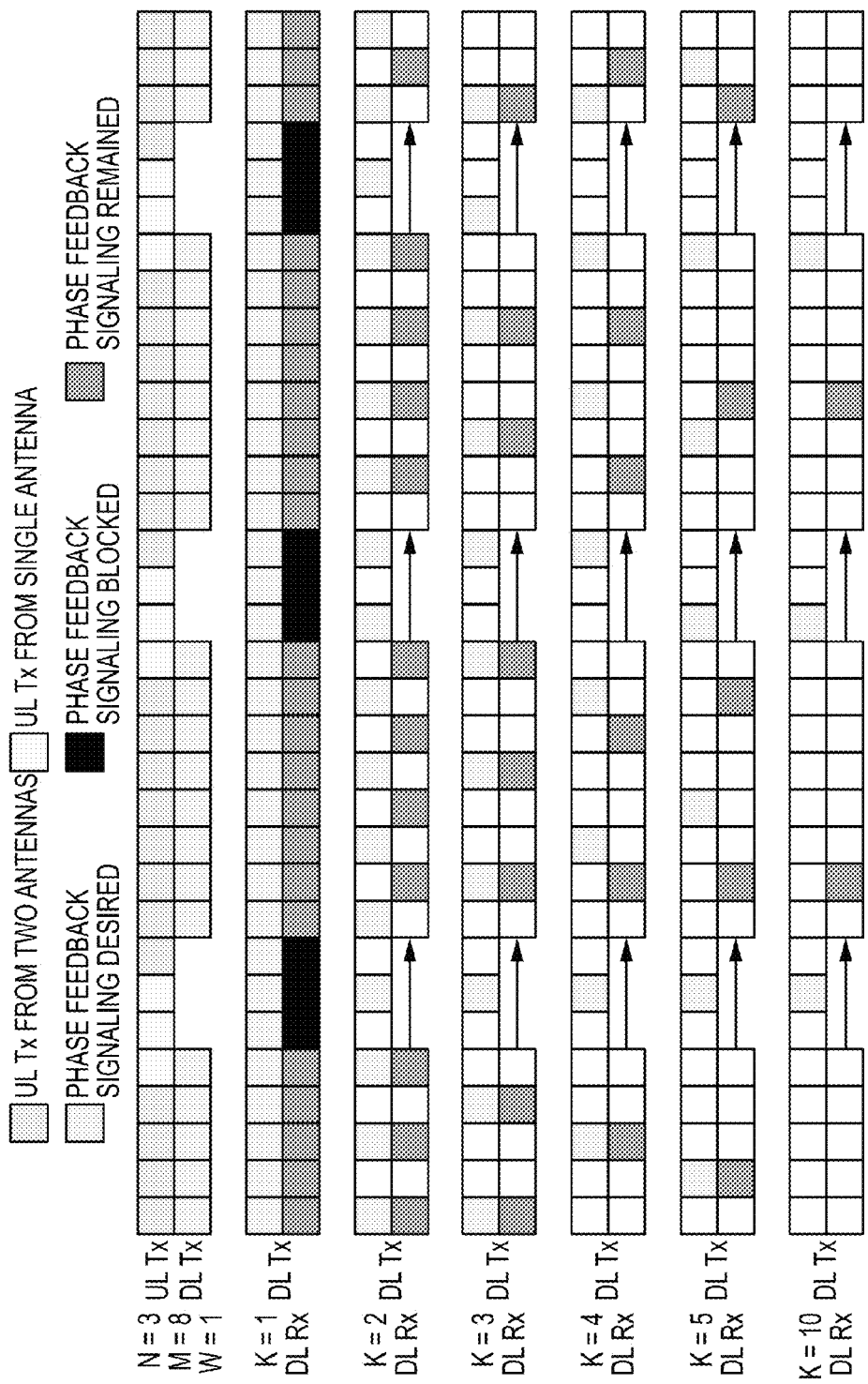
FIG. 4 illustrates a transmit operation of a single primary antenna (PA) radio link (RL) closed-loop transmit diversity (CL-TD) device in accordance with the prior art when phase feedback is frozen when blocked.
Figure 8:
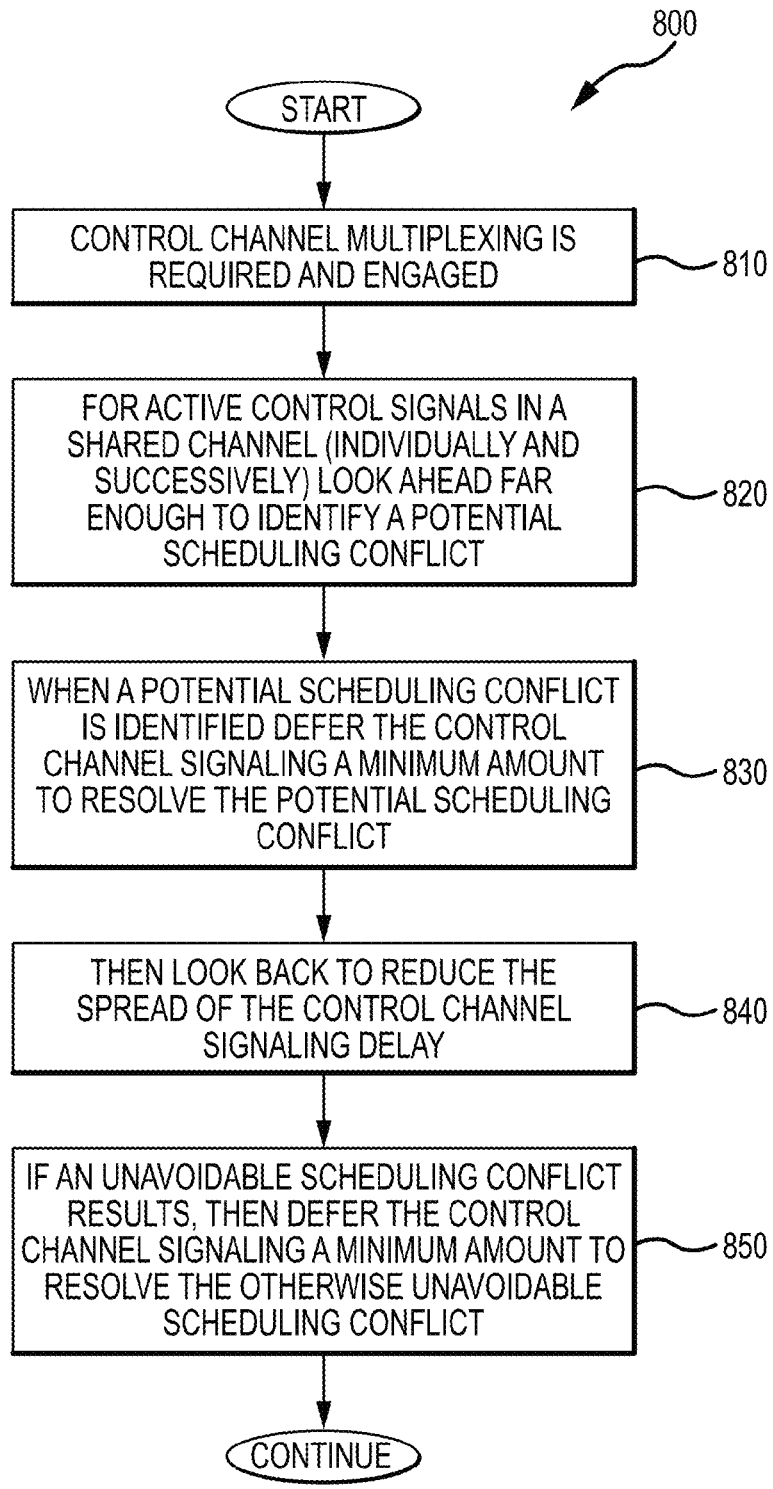
FIG. 8 illustrates an exemplary flow chart of a method that performs elastic multiplexing for shared control channels in accordance with the present work

FIG. 8 illustrates an exemplary flow chart 800 of a method that performs elastic multiplexing for shared control channels in accordance with the present work In the first step of the method control channel multiplexing is required and is enabled. (step 810). Then for active control signals in a shared channel (individually and successively) a look ahead step is performed that looks ahead far enough to identify a potential scheduling conflict (step 820). When a potential scheduling conflict is identified then the control channel signaling is deferred a minimum amount to resolve the potential scheduling conflict. (step 830). Then a look back step is performed that looks back to reduce the spread of the control channel signaling delay. (step 840). If an unavoidable scheduling conflict results, then the control channel signaling is deferred a minimum amount to resolve the otherwise unavoidable scheduling conflict. (step 850) and the method continues The method that is set forth in the flowchart 800 of FIG. 8 is general enough to be adapted for handling single or multiple signaling of one or more users sharing the same control channel with or without prioritization, yielding better scheduling results around multiplexing conflicts in terms of deviation from intended signaling rate and regularity. Table 1 provides a comparison of all schemes discussed, including suppressing (FIG. 3), freezing (FIG. 4) and deferring (FIG. 5) signaling timing when faced with scheduling conflict, as well as elastic multiplexing according to the present work (FIG. 6), for the aforementioned single-PA dual-antenna RL CL-TD example with single-antenna period N=3, dual-antenna period M=8, and a single active user.

TABLE 1

| Phase feed-back rate | No conflict | Suppress when conflict | | Freeze when conflict | | Defer when conflict | | Elastic when conflict | |
|---|---|---|---|---|---|---|---|---|---|
| | | Signaling interval in number of slots | | | | | | | |
| | Intended | Max | Min | Max | Min | Max | Min | Max | Min |
| 1500 Hz (K = 1) | 1 | 3 | 1 | 3 | 1 | 3 | 1 | 3 | 1 |
| 750 Hz (K = 2) | 2 | 4 | 2 | 5 | 2 | 5 | 2 | 4 | 2 |
| 500 Hz (K = 3) | 3 | 6 | 3 | 6 | 3 | 5 | 3 | 4 | 3 |
| 375 Hz (K = 4) | 4 | 8 | 4 | 7 | 4 | 7 | 4 | 6 | 5 |
| 300 Hz (K = 5) | 5 | 10 | 5 | 8 | 5 | 7 | 5 | 6 | 5 |
| 150 Hz (K = 10) | 10 | 40 | 10 | 13 | 13 | 11 | 11 | 11 | 11 |

Table 1 shows that elastic multiplexing yields the best result in terms of having the lowest maximum signaling interval among all, as well as having the least variation (=Max−Min) in signaling interval among all.

An interesting observation from Table 1 is that elastic multiplexing yields (6, 5) as (Max, Min) for 375 Hz (K=4) cases when the intended interval is four (4), and all other schemes are able to achieve four (4) as Min. Similarly for 150 Hz (K=10), elastic multiplexing yields eleven (11) as the Min value instead of ten (10) (but the Min value is still the same or better than two other schemes); however, elastic multiplexing yields eleven (11) as the Max value, which is better than all other schemes. This shows that elastic multiplexing is better able to reduce impact to system performance for worst cases than are conventional prior art schemes.

Some advantages of elastic multiplexing for shared control channels include (1) allowing channel resources sharing without pre-determined allocations or constraints, and (2) allowing channel resources sharing among control signaling of mixed types, rates and timing requirements, and (3) allowing individual control signaling to be dynamically attached to or removed from shared channel resources, and (4) allowing individual control signaling rates and timing parameters to be dynamically re-configured, and (5) allowing individual control signaling to take advantage of any available channel resources when in conflict for best possible system performance, and (6) allowing prioritization of individual control signaling to maintain best possible system performance around conflicts in need for shared control channel resources, and (7) allowing single unified scheduling method of all control signaling for ease of implementation.

It will be appreciated that elastic multiplexing such as described above is applicable to any downlink (DL) and uplink (UL) shared control channels, in any mobile wireless communication system.

Figure 9:
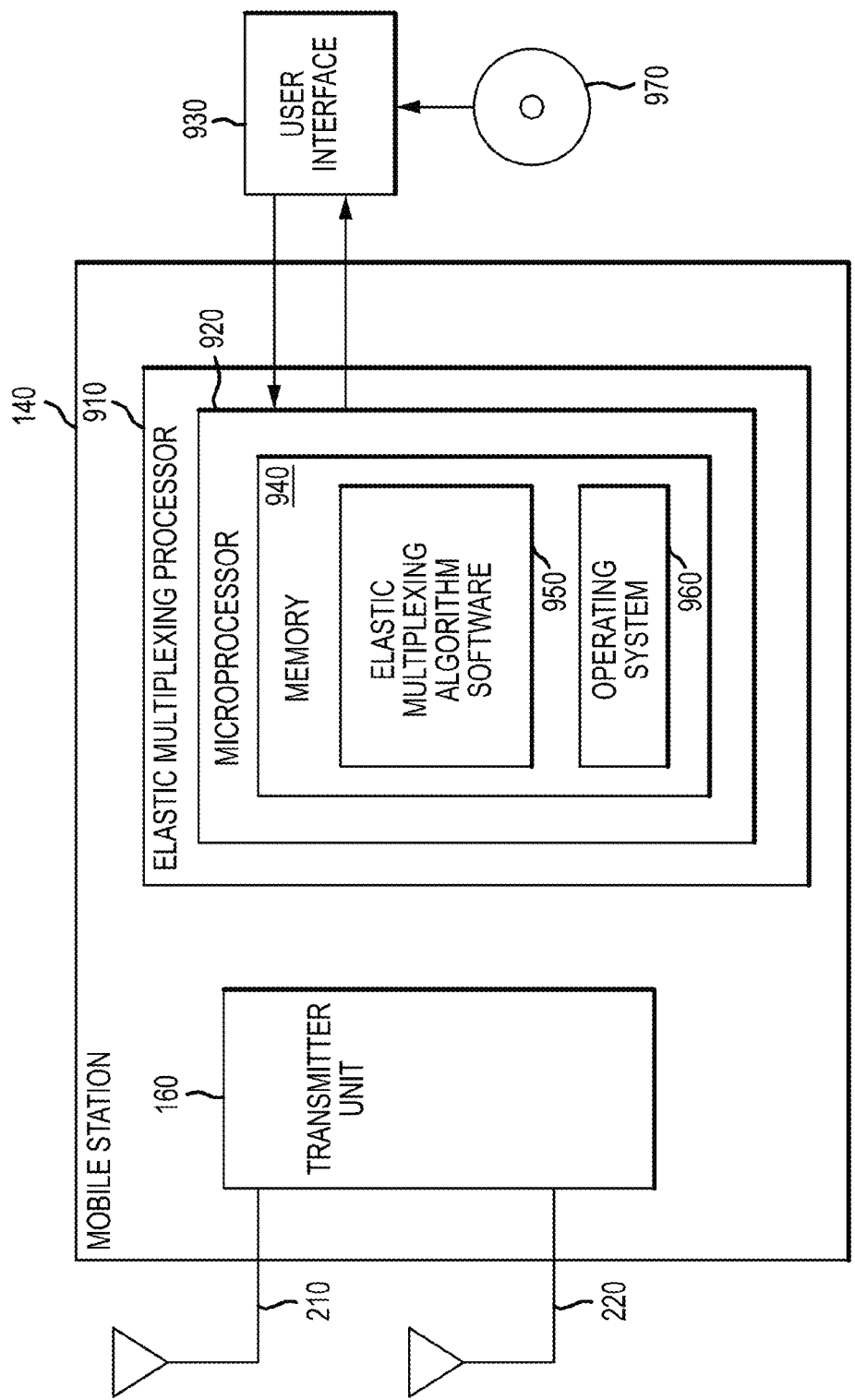
FIG. 9 illustrates a diagram of a portion of a wireless mobile station that comprises a transmitter unit, a primary antenna, a secondary antenna, and an elastic multiplexing processor in accordance with the principles of the present work.

FIG. 9 illustrates a diagram of a portion of wireless mobile station 140 that comprises a transmitter unit 160, a primary antenna 210, a secondary antenna 220, and an elastic multiplexing processor 910 in accordance with the principles of the present work. The primary antenna 210 and the secondary antenna 220 are coupled to the transmitter unit 160 as shown in FIG. 9. The elastic multiplexing process 910 is coupled to the transmitter unit 160 by signal lines that are not shown in FIG. 9.

The elastic multiplexing processor 910 comprises a microprocessor 920. A user interface unit 930 is connected to the microprocessor 920. The user interface unit 930 allows user access to the microprocessor 920 of the elastic multiplexing processor 910. The microprocessor 920 comprises a memory 940. The memory 940 comprises elastic multiplexing algorithm software 950 and an operating system 960. The microprocessor 240 of the elastic multiplexing processor 910 receives information from the mobile station 140 via signal lines that are not shown in FIG. 9. The microprocessor 920 of the elastic multiplexing processor 910 sends control signals to the transmitter unit 160 via control signal lines that are also not shown in FIG. 9.

Together the microprocessor 920 and the elastic multiplexing algorithm software 950 comprise an elastic multiplexing processor 910 that is cable of carrying out the elastic multiplexing function for the transceiver unit 160. The elastic multiplexing algorithm software 950 carries out the method of the present work to provide elastic multiplexing for shared control channels in a wireless device.

The elastic multiplexing algorithm software 950 comprises a computer program product for performing the method of the present work. The computer program product comprises a computer-readable medium that comprises code for carrying out computer instructions to perform the method. The computer program product is shown schematically in FIG. 9 as a computer-readable disk 970. The computer-readable disk 970 is merely illustrative of one type of computer program product. The computer program product may also comprise other types of computer-readable media such as magnetic tapes, hard drives, flash drives, and similar products.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method for performing elastic multiplexing for shared control channels in a wireless communication system, comprising:
   identifying a potential scheduling conflict of control channel signaling for a first and a second transmission before the potential scheduling conflict occurs;
   deferring the control channel signaling a first minimum amount for the first transmission and a second minimum amount for the second transmission in response to the identifying;
   performing a look back elastic multiplexing process to reduce a spread of the control channel signaling, wherein the look back is performed without receiving feed back from a receiver; and
   deferring the control channel signaling a third minimum amount for the first transmission or a fourth minimum amount for the second transmission, if a scheduling conflict results, to resolve the scheduling conflict.

2. The method of claim 1, further comprising:
   performing a look ahead elastic multiplexing process to identify a potential scheduling conflict.

3. The method of claim 1, wherein the elastic multiplexing is performed for shared control channels in a radio link (RL) closed-loop transmit diversity (CL-TD) wireless device.

4. The method of claim 1, further comprising:
   performing mixed control signaling by providing forward adjustment as well as backward adjustment to control signal timing.

5. The method of claim 4, further comprising:
   reducing variation of multi-signaling interval by providing forward adjustment to signaling timing; and
   reducing variation of multi-signaling interval by providing backward adjustment to signaling timing.

6. The method of claim 1, further comprising one of:
   providing control channel signals that have control signaling requirement values that are not necessarily the same among all users and all purposes;
   providing control channel signals that have control signaling requirements for a specific user that can vary over time; and
   providing control channel signals that compete for resource allocation one at a time.

7. An apparatus for performing elastic multiplexing for shared control channels in a wireless communication system, comprising:
   means for identifying a potential scheduling conflict of control channel signaling for a first and a second transmission before the potential scheduling conflict occurs; and
   means for deferring the control channel signaling a first minimum amount for the first transmission and a second minimum amount for the second transmission in response to the identifying;
   means for performing a look back elastic multiplexing process to reduce a spread of the control channel signaling, wherein the look back is performed without receiving feedback from a receiver; and
   means for deferring the control channel signaling a third minimum amount for the first transmission, if a scheduling conflict results, to resolve the scheduling conflict.

8. The apparatus of claim 7, wherein the means for identifying a potential scheduling conflict before the potential scheduling conflict occurs comprises:
   means for performing a look ahead elastic multiplexing process to identify a potential scheduling conflict.

9. The apparatus of claim 7, wherein the apparatus further comprises means for performing the elastic multiplexing for shared control channels in a radio link (RL) closed-loop transmit diversity (CL-TD) wireless device.

10. The apparatus of claim 7, wherein the apparatus further comprising means for performing mixed control signaling by providing forward adjustment as well as backward adjustment to control signal timing.

11. A computer program product for performing elastic multiplexing for shared control channels in a wireless communication system, comprising:
   a computer-readable medium comprising:
      code for causing at least one data processor to identify a potential scheduling conflict of control channel signaling for a first and a second transmission before the potential scheduling conflict occurs; and code for causing the at least one data processor to the defer control channel signaling a first minimum amount for the first transmission and a second minimum amount for the second transmission in response to the identifying;

code for performing a look back elastic multiplexing process to reduce a spread of the control channel signaling, wherein the look back is performed without receiving feedback from a receiver; and code for deferring the control channel signaling a third minimum amount for the first transmission or a fourth minimum amount for the second transmission, if a scheduling conflict results, to resolve the scheduling conflict.

12. The computer program product as set forth in claim 11, wherein the computer-readable medium further comprises:
code for causing the at least one data processor to perform a look ahead elastic multiplexing process to identify a potential scheduling conflict.

13. The computer program product as set forth in claim 11, wherein the computer-readable medium further comprises:
code for causing the at least one data processor to perform the elastic multiplexing for shared control channels in a radio link (RL) closed-loop transmit diversity (CL-TD) wireless device.

14. The computer program product as set forth in claim 11, wherein the computer-readable medium further comprises:
code for causing the at least one data processor to perform mixed control signaling by providing forward adjustment as well as backward adjustment to control signal timing.

15. An apparatus for performing elastic multiplexing for shared control channels in a wireless communication system, comprising:
an elastic multiplexing processor configured to:
identify a potential scheduling conflict of control channel signaling for a first and a second transmission before the potential scheduling conflict occurs;
defer the control channel signaling a first minimum amount for the first transmission and a second minimum amount for the second transmission after a potential scheduling conflict is identified;
perform a look back elastic multiplexing process to reduce a spread of the control channel signaling, wherein the lookback is performed without receiving feedback from a receiver; and
defer the control channel signaling a third minimum amount for the first transmission or a fourth minimum amount for the second transmission, if a scheduling conflict results, to resolve the scheduling conflict.

16. The apparatus as set forth in claim 15, the elastic multiplexing processor further configured to:
perform a look ahead elastic multiplexing process to identify a potential scheduling conflict.

17. The apparatus as set forth in claim 15, wherein the elastic multiplexing processor is configured to perform elastic multiplexing for shared control channels in a radio link (RL) closed-loop transmit diversity (CL-TD) wireless device.

18. The apparatus as set forth in claim 15, the elastic multiplexing processor further configured to:
perform mixed control signaling by providing forward adjustment as well as backward adjustment to control signal timing.

19. The apparatus as set forth in claim 18, wherein the elastic multiplexing processor is configured to:
reduce variation of multi-signaling interval by providing forward adjustment to signaling timing; and
reduce variation of multi-signaling interval by providing backward adjustment to signaling timing.

20. The apparatus as set forth in claim 15, wherein the elastic multiplexing processor is configured to:
provide control channel signals that have control signaling requirement values that are not necessarily the same among all users and all purposes;
provide control channel signals that have control signaling requirements for a specific user that can vary over time; and
provide control channel signals that compete for resource allocation one at a time.

* * * * *